United States Patent [19]

Tupper

[11] Patent Number: 4,593,447
[45] Date of Patent: Jun. 10, 1986

[54] THREADING DEVICE

[75] Inventor: Alan W. Tupper, Chippenham, England

[73] Assignee: Latchways Limited, Chippenham, England

[21] Appl. No.: 766,769

[22] Filed: Aug. 16, 1985

[30] Foreign Application Priority Data

Sep. 10, 1984 [GB] United Kingdom ............ 8422818

[51] Int. Cl.$^4$ ............................................. B23P 19/04
[52] U.S. Cl. ........................................ 29/241; 29/271; 43/1
[58] Field of Search ............ 29/819, 271, 241; 254/134.3 R; 226/91; 7/106; 81/487; 223/99; 112/224; 43/1

[56] References Cited

U.S. PATENT DOCUMENTS

| | | | |
|---|---|---|---|
| 2,324,176 | 7/1943 | Smith | 29/241 |
| 2,783,571 | 3/1957 | Stilwell | 43/1 |
| 4,265,179 | 5/1981 | Tupper et al. | 104/182 |
| 4,313,236 | 2/1982 | Tupper et al. | 9/14 |
| 4,352,330 | 10/1982 | Tupper | 104/96 |
| 4,357,889 | 11/1982 | Tupper | 114/114 |
| 4,459,916 | 7/1984 | Tupper | 104/106 |
| 4,462,316 | 7/1984 | Tupper | 105/151 |

FOREIGN PATENT DOCUMENTS

| | | |
|---|---|---|
| 2097052 | 10/1982 | United Kingdom . |
| 2096959 | 10/1982 | United Kingdom . |
| 2108578 | 5/1983 | United Kingdom . |
| 2130157 | 5/1984 | United Kingdom . |

OTHER PUBLICATIONS

Pennsylvania Outdoor Warehouse Catalog, 1986, "Buddy Line Threader".

Primary Examiner—Robert C. Watson
Attorney, Agent, or Firm—Frishauf, Holtz, Goodman & Woodward

[57] ABSTRACT

A threading device comprises a star wheel formed of two half sections secured together and rotatably mounted in a casing to project therefrom. The confronting surfaces of the radial projections of the mating star wheel parts near the tip thereof are formed with arcuate grooves in which an arcuate central portion of a rod-like threading member is slidably located but trapped therebetween. The threading member has elongate end portions projecting one on each side of the star wheel and one such portion is adapted for connection thereto of a flexible elongate line to be threaded by the device. The leading elongate end portion of the threading member is passed through, or beneath, an element with which the line is to be threaded to effect a threading operation.

10 Claims, 18 Drawing Figures

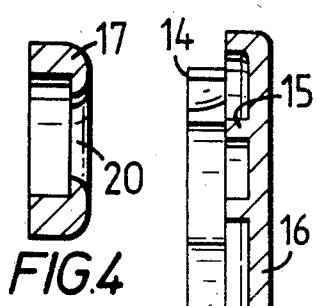
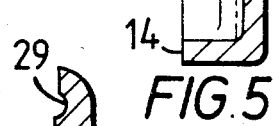
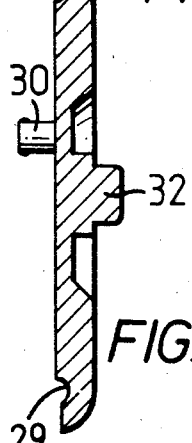
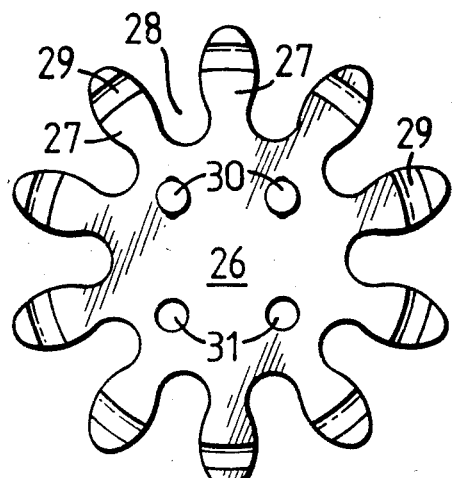
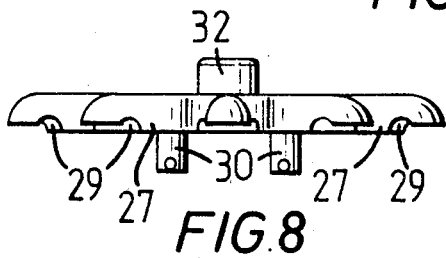
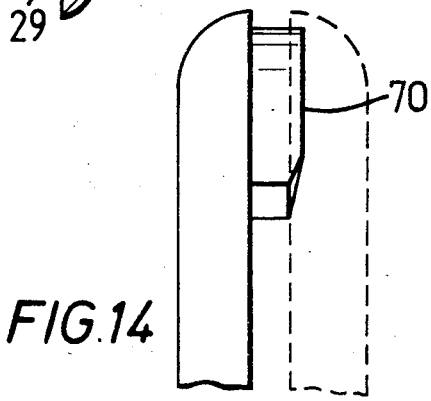
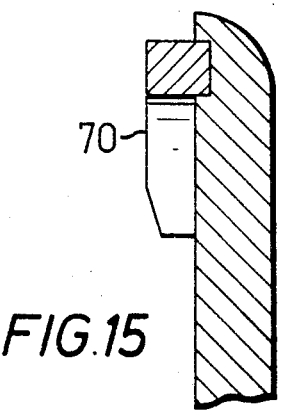

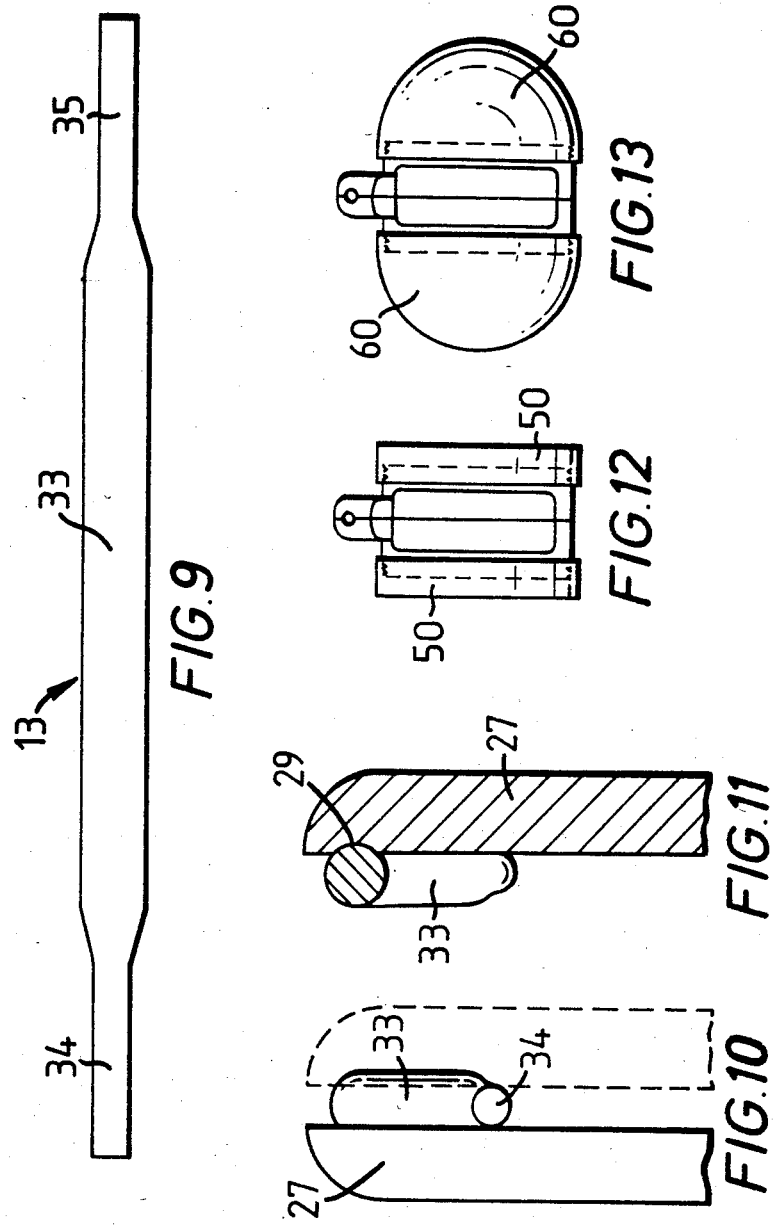

THREADING DEVICE

FIELD AND BACKGROUND OF THE INVENTION

This invention relates to a device for facilitating the threading of a line, thread or other flexible elongate member through or beneath or around another element.

For example, deploying a fishing line along a rod by threading it from the reel through metal guide loops provided along the rod, can be an awkward operation. The invention seeks to provide a device which can be used to facilitate this threading operation as well as many other similar threading operations of a line or a thread or other thin flexible element, e.g. for weaving or possibly even stitching operations for sail-makers or carpet-layers or possibly even for surgical operations using a suture.

My British Patent Specification No. 2,130,157 describes a threading device for threading a mooring line through a ring on a dockside. The present invention provides a construction which is more suitable for the type of threading operations with which the invention is concerned where finer threads or lines are used. U.S. Pat. Nos. 4,265,179; 4,352,330; 4,313,236; 4,357,889; 4,459,916; 4,462,316; and British Pat. Nos. 2,096,959; 2,097,052 and 2,108,578 disclose star-wheel devices used for systems generally supporting movable loads but are also unsuitable for the threading operations with which the present invention is concerned.

SUMMARY OF THE INVENTION

The invention provides a threading device comprising:

a wheel having a series of recesses at spaced locations around its periphery defining projecting portions of the wheel therebetween, the wheel comprising two parts having confronting side surfaces and each part having corresponding recesses and projecting portions as aforesaid with the recesses and projecting portions of the two parts being aligned with one another;

a support on which said wheel is rotatably located;

a rod-like threading member having a generally arcuate central portion and elongate end portions projecting from respective ends of the central portion;

the confronting surfaces of said projecting portions of said wheel parts having corresponding arcuate grooves therein in which said arcuate control portion of the threading member engages to be slidably retained therein with said elongate end portions projecting from respective sides of the wheel;

at least one of said elongate end portions of the threading member having means for releasably securing thereto an end portion of a flexible elongate member to be threaded by use of the device;

whereby, when an elongate end portion of the threading member is engaged with an element with which said flexible elongate member is to be threaded, said element can engage in one of said recesses in the wheel which can then rotate about its axis relative to the threading member thereby allowing the threading member to pass through or beneath said element to thread said flexible elongate member, which is attached to the other elongate end portion of the threading member, with respect to said element.

In another aspect, the invention provides in a threading device comprising a wheel having at least one recess in its periphery and being formed of two parts; a support on which said wheel is rotatably mounted, and an elongate threading member extending between the wheel parts and having threading portions projecting on opposite sides of the wheel, arcuate interengaging means being provided on a central portion of the threading member and the wheel to allow rotation of the wheel with respect to the threading member whilst locating the threading member with respect to the wheel, the improvement wherein said wheel parts have confronting side surfaces and said threading member is a rod-like member having a generally arcuate central portion and elongate end portions projecting from respective ends of the central portion, the confronting surfaces of the wheel parts adjacent the periphery thereof having arcuate grooves therein to slidably receive and retain said arcuate central portion of the rod-like threading member with said elongate end portions projecting from respective sides of the wheel; and at least one of said elongate end portions of the threading member having means for releasably securing thereto an end portion of a flexible elongate member to be threaded by use of the device.

Said support may be in the form of a casing and said wheel may be received in a cavity in the casing to protrude therefrom with the threading member cooperating with the protruding part of the wheel.

The wheel parts may have axially aligned cylindrical projections which engage in corresponding recesses provided in respective opposite side walls of the cavity in the casing to rotatably locate the wheel in the casing.

Means may be provided to enable said parts of the wheel to be snap fitted together.

The casing may be formed as two parts and means may be provided for enabling those parts to be snap fitted together.

Said means for securing the end portion of a member to be threaded by the device to the threading member may comprise a coil spring provided on the threading member, e.g., push fitted on a threading portion thereof or a notch formed in the threading portion.

BRIEF DESCRIPTION OF THE DRAWINGS

Embodiments of the invention will be described by way of example and with reference to the accompanying drawings, in which:

FIGS. 4 and 5 are respectively cross-sections along lines A—A and B—B through the casing half of the device of FIG. 2;

FIG. 6 is a side view of one half of the wheel of the device of FIG. 1;

FIGS. 7 and 8 are respectively a vertical cross-section through the wheel half of FIG. 6 and a plan view thereof;

FIG. 9 is a plan view of the slipper associated with the wheel of the device of FIG. 1;

FIG. 10 is a diagrammatic representation illustrating cooperation of the slipper with the wheel halves;

FIG. 11 is a similar representation to FIG. 10 but in vertical cross-section;

FIG. 12 is a diagrammatic view of a second embodiment;

FIG. 13 is a diagrammatic end view of a third embodiment;

FIG. 14 is a diagrammatic representation illustrating cooperation between the slipper and the wheel halves of another embodiment; and FIG. 15 is a similar representation to FIG. 14 but in vertical cross-section.

DETAILED DESCRIPTION

Referring to FIGS. 1 to 11, a threading device for a fishing line comprises a casing 11, a rotary wheel 12 partly housed in the casing and a stainless steel threading member 13 located on the wheel. The casing and the rotary wheel are made from moulded plastics parts which can be snap fitted together to assemble the device as described below.

Figure 2:
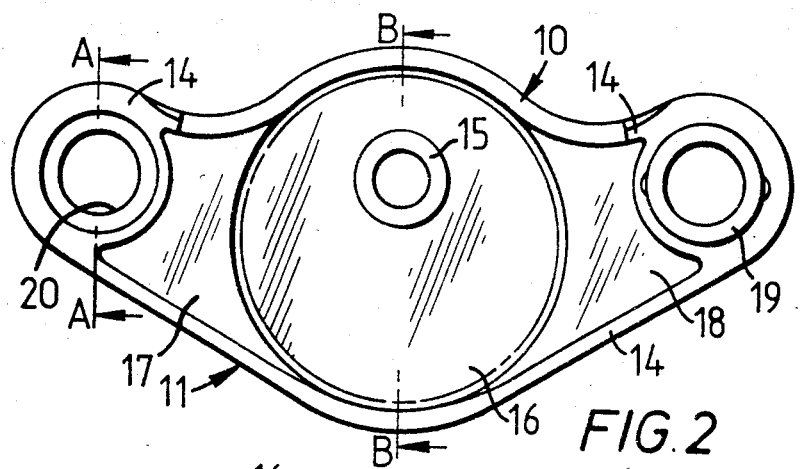
FIG. 2 is a side view of one half of the casing element of the device of FIG. 1.
Figure 3:
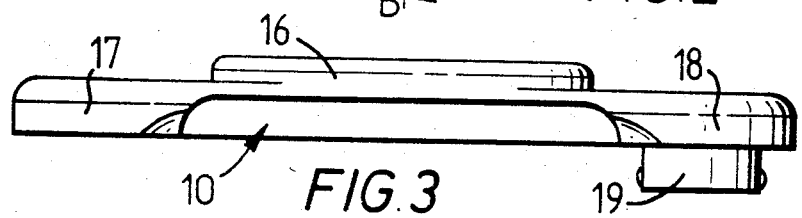
FIG 3 is a plan view of the casing element of FIG. 2.

The casing 11 comprises two half sections each formed with a generally circular central portion 16 and with two end flanges 17,18 projecting therefrom. Each casing half is moulded to have flat side surfaces for the circular central portion 16 and the flanges 17,18 with a peripheral wall 14 projecting from the flat surfaces as illustrated in FIGS. 2 and 5. As seen in FIGS. 3 and 5 the end flanges 17 and 18 are narrower than the circular central portion 16 which projects outwardly thereof.

As shown in FIG. 3, the flange 18 is formed with a projecting stud 19 which is sized and shaped to be a snap fit in an aperture in the cooperating flange of the complementary half section of the casing. Similarly the flat side wall of the flange 17 is formed with an aperture 20, as illustrated in FIG. 4, which is sized to receive, as a snap fit, a stud projecting from the cooperating flange of the complementary half section of the casing. In this way two complementary casing half sections can be secured together with the free edges of their peripheral walls 14 in abutting engagement.

Figure 1:
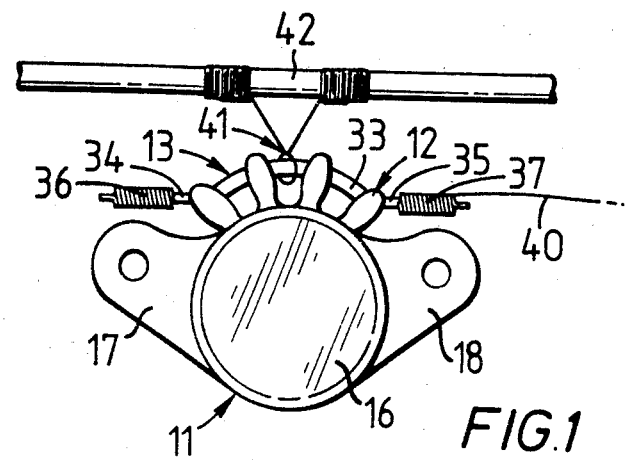
FIG. 1 is a diagrammatic side view of an assembled fishing line threading device in accordance with the invention.

When the two casing half sections are snap fitted together, they define an internal cavity within the engaging peripheral walls 14 thereof for receiving the wheel 12. A tubular boss 15 is formed on the inner surface of the flat side wall of the central portion 16 of each casing half for receiving a respective axle of the wheel 12. An upper central portion of the peripheral wall 14 of each casing half section is cut away at 10, as illustrated in FIG. 3, to provide a slot in the cooperating walls 14 of the casing halves when fitted together, through which a portion of the wheel 12 can project to cooperate with the threading member 13 as illustrated in FIG. 1

The wheel 12 is also formed as two complementary half sections, one of which is illustrated in FIGS. 6 to 8, which are snap fitted together. Each wheel half section has a central hub portion 26 and an annular series of spaced radial projections 26 integrally formed with the hub.

A recess 28 is defined between each projection 27 for a purpose described below. The confronting surfaces of each wheel half section, near the tips of the projection 27 thereof, are formed with arcuate grooves 29 which are part-circular in cross-section. The arcuate grooves 29 lie on a circle centered on the axis of the wheel.

The hub of each wheel half section is formed with a pair of integral pins 30 projecting therefrom and a pair of apertures 31 positioned to receive the pins of the complementary wheel half section as a snap fit to secure together the two half sections with the radial projections 27 thereof in axial alignment. On the opposite side of the hub a projecting axle 32 is formed. Therefore, when the wheel half sections are snap fitted together, the wheel 12 has a pair of axles projection on opposite sides thereof for engagement in the tubular bosses 15 provided on the casing half sections. The wheel 12 is thereby rotatable to locate the wheel within the casing, formed by snap fitting together the two casing half sections as described above, with a portion of the wheel sections always projecting out of the casing through the aforesaid slot 10 in the peripheral wall thereof. The two wheel half sections and/or the two casing half sections may also be ultrasonically welded to each other.

Figure 1A:
FIG. 1A is a diagrammatic side view of a portion of the threading member of a second embodiment.

Referring to FIGS. 9 to 11, the threading member 13 comprises an arcuate central part 33 of circular cross-section with integral, narrower fingers 34,35 projecting outwardly from respective ends thereof. The arcuate central part 33 is received in pairs of cooperating grooves 29 in adjacent sets of projections 27 of the wheel half sections. The wheel is able to rotate about its axis in either direction with respect to the threading member 13 while the threading member 13 remains located with respect to the wheel since it is at all times engaged in the cooperating recesses 29 in adjacent sets of projections 27 of the wheel half sections. Stainless steel tension springs 36,37 are a push fit on the projecting fingers 34,35 of the threading member, respectively, to allow a fishing line 40 to be readily attached thereto by winding it between the coils of the spring. Alternative trapping means for the line may be provided on the fingers 34,35, e.g. a notch 9 (FIG. 1A) could be formed therein in which a line could be engaged.

In order to carry out a threading operation, the line of a fishing reel is engaged in one or the other coil springs 36,37 as aforesaid and the opposite finger 34 of the threading member is engaged in the first guide loop 41 on the rod 42. On further forward movement of the device, the loop 41, which encircles the threading member 13, engages in a recess 28 between an adjacent pair of projections 27 of the wheel. The loop then passes over the arcuate central part 33 of the threading member and in so doing causes the wheel to rotate (clockwise in FIG. 1). Finally the loop disengages from the wheel and passes over the rear finger 35 of the threading member so that the line 40 attached to that finger is then threaded through the loop. This operation is repeated for each loop on the rod so that the line is threaded through each such loop. It will be appreciated that use of a device according to the invention, which is particularly convenient to manipulate and readily traverses each fishing rod guide loop, greatly facilitates threading of the fishing line. The device is compact and can be readily accommodated, e.g. in a pocket by itself or attached to a keyring.

After a threading operation the line is readily detached from the tension spring 37 so that the trace-to-fly line can be attached thereto ready for fishing.

FIGS. 12 and 13 show modified versions of the above-described device in which the outer peripheries of the projecting central portions of the casing are formed with fine screw threads onto which are screwed detachable weights 50 or plastic float elements 60. In this way, the device itself can provide, after a threading operation, a connection between the main fishing line and the trace-to-fly line which is attached to the opposite finger of the threading member 33. The device then acts as a weight or a float as required.

FIGS. 14 and 15 illustrate a further embodiment in which the slipper 70 is made of a wire having a square cross-section.

A threading device according to the invention can be employed for weaving processes where it replaces the conventional shuttle. Instead of passing through the shed formed during weaving through which a shuttle is passed, the device would pass over one set of threads on one side of the shed to thread a strand attached to the device beneath those threads.

Figure 1B:
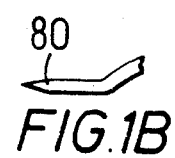
FIG. 1B is a diagrammatic side view of a forward portion of a threading member of another embodiment.
Figure 1C:
FIG. 1C is a diagrammatic plan view of a rear portion of the threading member of FIG. 1B.

For stitching operations the threading member could be formed with a pointed leading portion 80 as illustrated in FIG. 1B, with an eye 81 being formed on the trailing portion of the threading member, as illustrated in FIG. 1C.

I claim:

1. A threading device comprising:
   a wheel having a series of recesses at spaced locations around its periphery defining projecting portions of the wheel therebetween, the wheel comprising two parts having confronting side surfaces and each part having corresponding recesses and projecting portions as aforesaid with the recesses and projecting portions of the two parts being aligned with one another;
   a support on which said wheel is rotatably located;
   a rod-like threading member having a generally arcuate central portion and elongate end portions projecting from respective ends of the central portion;
   the confronting surfaces of said projecting portions of said wheel parts having corresponding arcuate grooves therein in which said arcuate central portion of the threading member engages to be slidably retained therein with said elongate end portions projecting from respective sides of the wheel;
   at least one of said elongate end portions of the threading member having means for releasably securing thereto an end portion of a flexible elongate member to be threaded by use of the device;
   whereby, when an elongate end portion of the threading member is engaged with an element with which said flexible elongate member is to be threaded, said element can engage in one of said recesses in the wheel which can then rotate about its axis relative to the threading member thereby allowing the threading member to pass through or beneath said element to thread said flexible elongate member, which is attached to the other elongate end portion of the threading member with respect to said element.

2. A threading device according to claim 1 wherein said support comprises a casing having a cavity in which said wheel is rotatably located with a portion of the wheel projecting from the cavity.

3. A threading device according to claim 1 wherein said means comprises a coil spring positioned on a respective elongate end portion of the threading member.

4. A threading device according to claim 1 wherein said means comprises a notch formed in an elongate end portion of the threading member.

5. A threading device according to claim 1 including means for enabling said two parts of the wheel to be snap fitted together.

6. A threading device according to claim 2 wherein said casing comprises two parts having juxtaposed confronting surfaces.

7. A threading device according to claim 6 including means for enabling said two parts of the casing to be snap fitted together.

8. A threading device according to claim 2 wherein the wheel parts have axially aligned cylindrical projections which engage in corresponding recesses provided in respective opposite side walls of the cavity in the casing to rotatably locate the wheel in the casing.

9. A threading device according to claim 1 wherein one of said elongate end portions is formed with a pointed free end to facilitate sewing operations.

10. In a threading device comprising a wheel having at least one recess in its periphery and being formed of two parts; a support on which said wheel is rotatably mounted, and an elongate threading member extending between the wheel parts and having threading portions projecting on opposite sides of the wheel, arcuate interengaging means being provided on a central portion of the threading member and the wheel to allow rotation of the wheel with respect to the threading member whilst locating the threading member with respect to the wheel, the improvement wherein said wheel parts have confronting side surfaces and said threading member is a rod-like member having a generally arcuate central portion and elongate end portions projecting from respective ends of the central portion, the confronting surfaces of the wheel parts adjacent the periphery thereof having arcuate grooves therein to slidably receive and retain said arcuate central portion of the rod-like threading member with said elongate end portions projecting from respective sides of the wheel; and at least one of said elongate end portions of the threading member having means for releasably securing thereto an end portion of a flexible elongate member to be threaded by use of the device.

* * * * *